United States Patent [19]

Teske

[11] 4,440,097
[45] Apr. 3, 1984

[54] ASH-REMOVAL CONVEYOR FOR A COAL-FIRED BOILER

[76] Inventor: Lothar Teske, Hegelstr. 15, 5000 Köln 90, Fed. Rep. of Germany

[21] Appl. No.: 409,018

[22] Filed: Aug. 17, 1982

[30] Foreign Application Priority Data

Aug. 19, 1981 [DE] Fed. Rep. of Germany ....... 3132698

[51] Int. Cl.³ .......................... F23J 1/02; B65G 23/44
[52] U.S. Cl. .................................. 110/167; 198/810; 198/813; 198/856
[58] Field of Search ....................... 110/259, 170, 171; 198/810, 813, 856, 855; 414/211

[56] References Cited

U.S. PATENT DOCUMENTS

| | | | |
|---|---|---|---|
| 2,983,234 | 5/1961 | Reilly | 110/259 X |
| 3,915,105 | 10/1975 | Michelbrink | 110/171 X |
| 4,112,856 | 9/1978 | Fuhrman | 110/171 X |
| 4,284,192 | 8/1981 | Taylor | 198/813 |

FOREIGN PATENT DOCUMENTS

| | | | |
|---|---|---|---|
| 1130355 | 5/1962 | Fed. Rep. of Germany | 198/813 |
| 1456925 | 12/1971 | Fed. Rep. of Germany | |
| 793229 | 4/1958 | United Kingdom | 198/810 |
| 253647 | 1/1970 | U.S.S.R. | 198/813 |
| 394271 | 1/1974 | U.S.S.R. | 198/855 |
| 546274 | 2/1977 | U.S.S.R. | 198/856 |

Primary Examiner—Albert J. Makay
Assistant Examiner—David E. Helmbold
Attorney, Agent, or Firm—Karl F. Ross; Herbert Dubno

[57] ABSTRACT

A ash-removal conveyor used in combination with an ash-quenching trough has a drive wheel above and spaced from the trough, horizontally spaced reversing and guide wheels in the trough below the liquid level therein, and an endless conveyor chain spanned over the wheels and having a horizontal lower stretch extending between the reversing and guide wheels, an inclined lower stretch extending between the guide and drive wheels, and an at least partially inclined upper stretch extending between the reversing and drive wheel. The drive wheels are tensioned away from the other wheels and to tension the belt. A drive connected to the drive wheel moves the chain to pick up ash in the trough and conduct the picked-up ash from the trough. The conveyor has a floor immediately beneath and extending along the upper stretch between the reversing and drive wheels and above the lower stretches. The drive means moves the chain in a direction to pick up ash with the horizontal lower stretch and convey it away along the floor with the upper stretch.

10 Claims, 3 Drawing Figures

ASH-REMOVAL CONVEYOR FOR A COAL-FIRED BOILER

FIELD OF THE INVENTION

The present invention relates to a conveyor for removing ash from the coal burner of a heavy-duty boiler. More particularly this invention concerns such a conveyor which lifts the ash up out of a water-filled quenching trough into which hot ashes are dumped directly from the burner.

BACKGROUND OF THE INVENTION

In a coal-fired boiler of the type used in a powerplant to generate steam for the production of electricity, it is standard to provide automatic equipment which periodically or continuously empties the coal ash out of the bottom of the boiler. The hot ash is dumped straight into a water-filled quenching pit, quenching and cooling it instantly sufficiently to handle it. A conveyor transports the wet ash to a storage facility, bricketing operation, or other facility.

The conveyor for such a task must therefore be able to move this heavy and wet bulk material up from below the liquid level in the quenching vessel and carry it some distance. The wet ash is quite abrasive also, so it is very difficult to transport. Hence recourse has been had to scraper-type conveyors.

One such conveyor is described in German patent document No. 2,620,836. In this arrangement the scraper chain is looped at one end over a drive wheel that is outside the quenching vessel, is deflected over several guide wheels submerged in the vessel, and is looped over at least one deflecting roller, so that the submerged portion of the underneath stretch of the chain can sweep the floor of the quenching vessel. The two end rollers, that is the drive and deflecting rollers, are both above the quenching vessel so that the chain travels over a long path having at least five straight stretches, with the lower stretches—one horizontal along the vessel floor and one inclined up out of the vessel—serving to convey the ash by pushing it along in an appropriate channel. This guiding structure is quite complex and must operate as mentioned above in the presence of water and abrasive grit, so that service problems are considerable.

The chain of such a conveyor must naturally be kept taut. To this end a standard spring-loaded tightener is associated with one of the guide or deflecting wheels. The tension must be tight enough that the drive wheel, normally a faceted structure whose sides correspond to the links of the chain, does not slip on the chain unless tension in the chain is so great as to risk breaking it. The problem with such an arrangement is that the loading of the conveyor is not uniform; part of the time it will run virtually empty and part it will be very heavily laden, depending on operating conditions of the respective boiler or boilers. The spring of the tensioner is normally adjusted for the maximum load, so that when the device is partly empty the chain is unnecessarily taut and the bearings for the various chain-support wheels are unnecessarily loaded.

In general the known ash-removal conveyors are not responsive to working conditions. They are normally set to operate with a given tension and at a given speed, both calculated to be effective with the greatest load the chain is expected to carry. An electrical system is described in German Pat. No. 1,456,925 for varying conveyor speed in response to some load conditions, but this system responds too slowly to operating conditions and requires complicated load-sensing means.

OBJECTS OF THE INVENTION

It is therefore an object of the present invention to provide an improved ash-removal conveyor for an automatically unloaded coal-fired boiler.

Another object is the provision of such an ash-removal conveyor for an automatically unloaded coal-fired boiler which overcomes the above-given disadvantages.

A further object is to provided such an arrangement which is subject to less wear than the prior-art ones, but that works at least as well.

SUMMARY OF THE INVENTION

These objects are attained according to the instant invention in an ash-removal conveyor used in combination with an ash-quenching trough, and having a drive wheel above and spaced from the trough, horizontally spaced reversing and guide wheels in the trough below the liquid level therein, and an endless conveyor chain spanned over the wheels and having a horizontal lower stretch extending between the reversing and guide wheels, an inclined lower stretch extending between the guide and drive wheels, and an at least partially inclined upper stretch extending between the reversing and drive wheel. Tensioning means urges the drive wheel away from the other wheels and thereby tensions the belt. Drive means connected to the drive wheel moves the chain to pick up ash in the trough and conduct the picked-up ash from the trough.

Thus with the system of this invention the set of guide rollers outside the trough is eliminated, so that the upper stretch extends back to the drive wheel in the trough with the lower stretch. This chain configuration greatly shortens the chain and appreciably reduces the complexity of the system. Obviously service problems are reduced considerably.

The conveyor according to this invention further has a floor immediately beneath and extending along the upper stretch between the reversing and drive wheels and above the lower stretches. The drive means moves the chain in a direction to pick up ash with the horizontal lower stretch and convey it away along the floor in the opposite direction with the upper stretch. Since the ash is carried back on the top stretch, it is possible to run the bottom stretch right underneath this floor, as no space need be provided above the bottom stretch to clear the ash. Such an arrangement also completely eliminates the problem caused when a very large lump of ash must be conveyed, as usually with the prior-art machines such a large piece would strike the returning upper stretch or associated structure until it was broken up or the conveyor jammed.

According to another feature of this invention the drive means includes a hydraulic motor operatively connected to the drive wheel, and pump means for supplying hydraulic liquid to the motor for operating same. Using a hydraulic motor like this gives a particular advantage when the urging means includes at least one hydraulic cylinder connected to the drive wheel and pressurizable to tension the chain, and means connecting the cylinder to the pump means for pressurization of the cylinder with substantially the same pressure in the hydraulic motor. In this manner when the motor pressure starts to rise, indicating that the motor is running with increased resistance, the tensioning force similarly rises. Automatically a heavy load is met with a tautly tensioned chain, and when the machine is running empty or under a light load the chain will be looser. Wear for the bearings carrying the various wheels is thereby reduced greatly.

In addition, the urging means has sensor means for detecting the pressure in the cylinder and motor, and control means connected to the pump means for varying the output of same in accordance with the detected pressure. For example under heavy-load conditions the chain would be driven more slowly so as both not to overload itself and not to overcharge whatever stage of the process it is delivering the wet quenched ash to. When the load lightens the operation speed can be brought up while, of course, the chain tension is decreased.

In such a construction the pump means includes a positive-displacement pump, e.g. of the axial-piston type, connected to the drive motor. The control means decreases pump output as detected pressure increases above a predetermined limit. Similarly the drive motor can be a positive-displacement pump operated as a motor.

The sensor means can be a mechanical/electrical transducer, such as of the strain-gauge type, that produces an electrical output corresponding to the detected pressure and the control means receives the electrical output and responds to same. The control means would be a standard solenoid or servomotor operating the pump, e.g. tipping the swash plate thereof.

In order to prevent the system from responding to minor variations in loading the control means includes a signal delay means for retarding the transmission of the signal to the pump for varying the pump output only after a predetermined interval in response to a change in the detected pressure. In a wholly hydraulic system a similar delay arrangement could be employed.

The overall equipment size can be greatly reduced by an upper guide wheel subdividing the upper chain stretch into a horizontal upper stretch between the reversing wheel and the upper guide wheel and an inclined upper stretch between the upper guide wheel and the drive wheel. Thus the upper and lower stretches are closely juxtaposed so that the machine takes up relatively little space.

DESCRIPTION OF THE DRAWING

The above and other features and advantages will become more readily apparent from the following, reference being made to the accompanying drawing in which:

FIG. 3 is a diagram illustrating the chain of this invention.

SPECIFIC DESCRIPTION

Figure 1:
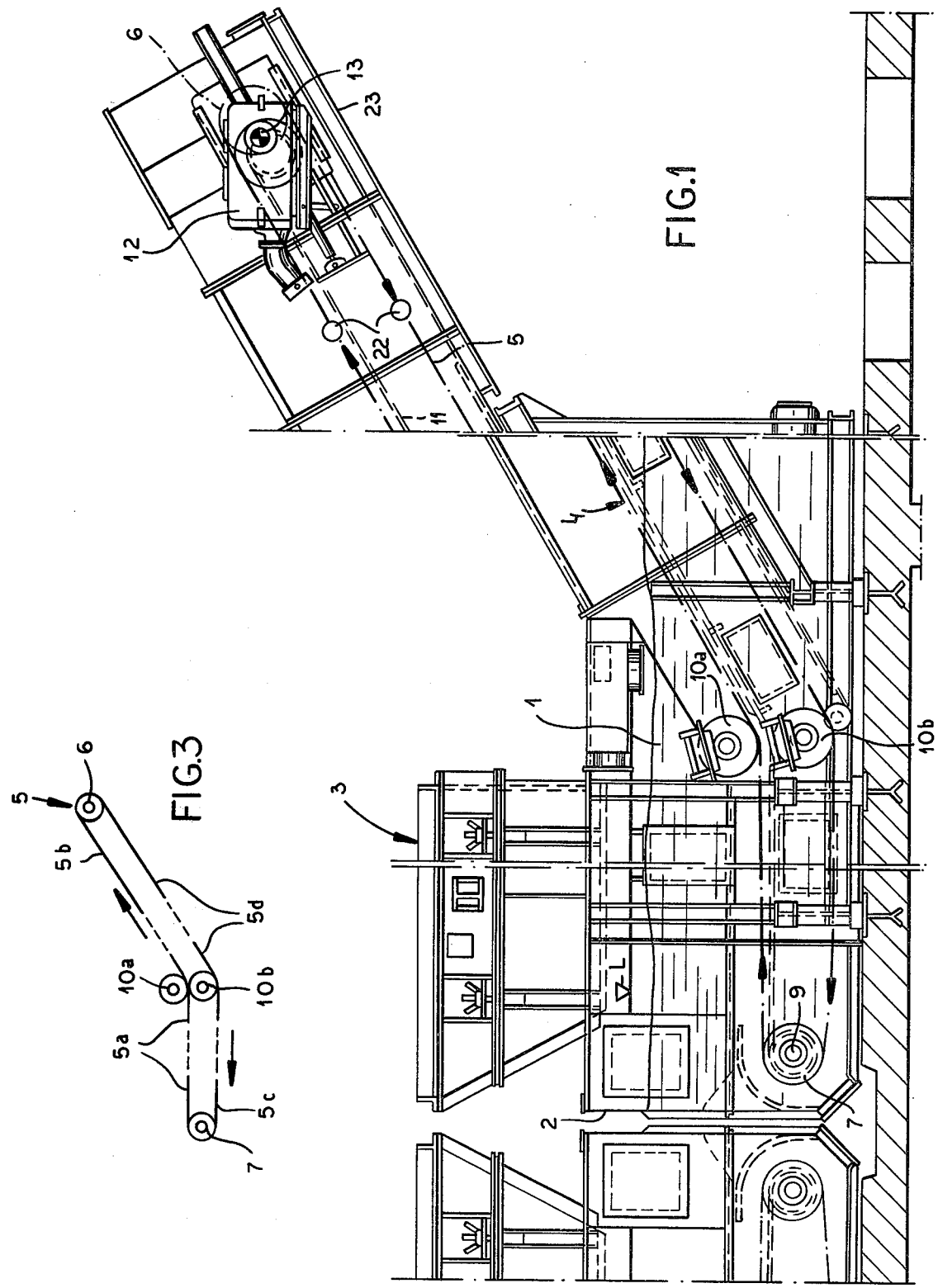
FIG. 1 is an axial section through the apparatus according to the invention.

As seen in FIG. 1, a conventional quenching vessel or trough 2 contains a bath 1 of water and is arranged to receive ash directly from the automatic ash unloader 3 of a large coal-fired boiler. A scraper-type chain conveyor 4 moves wet quenched ash up and out of the trough to a bricketting or storage operation.

This conveyor 4 comprises two endless chains 5 bridged by standard flat scrapers 22 and extending perfectly parallel to each other up along a support frame 23 out of the trough 2. The chains 5 pass 180° around a drive wheel or sprocket 6 at the upper end of the frame, 180° around a reversing wheel 7 carried on a shaft 9 provided in the trough 2 below the liquid level L therein, and the upper and lower chain stretches are respectively deflected through small angles by upper and lower guide wheels 10a and 10b.

Thus as illustrated schematically in FIG. 3, the upper and lower stretches of the chains 5 are subdivided into parallel and inclined stretches 5b and 5d mostly out of the trough 2 and parallel and horizontal stretches 5a and 5c fully submerged below the level L. A floor panel 11 (FIG. 1) extends wholly along the upper stretches.

Figure 2:
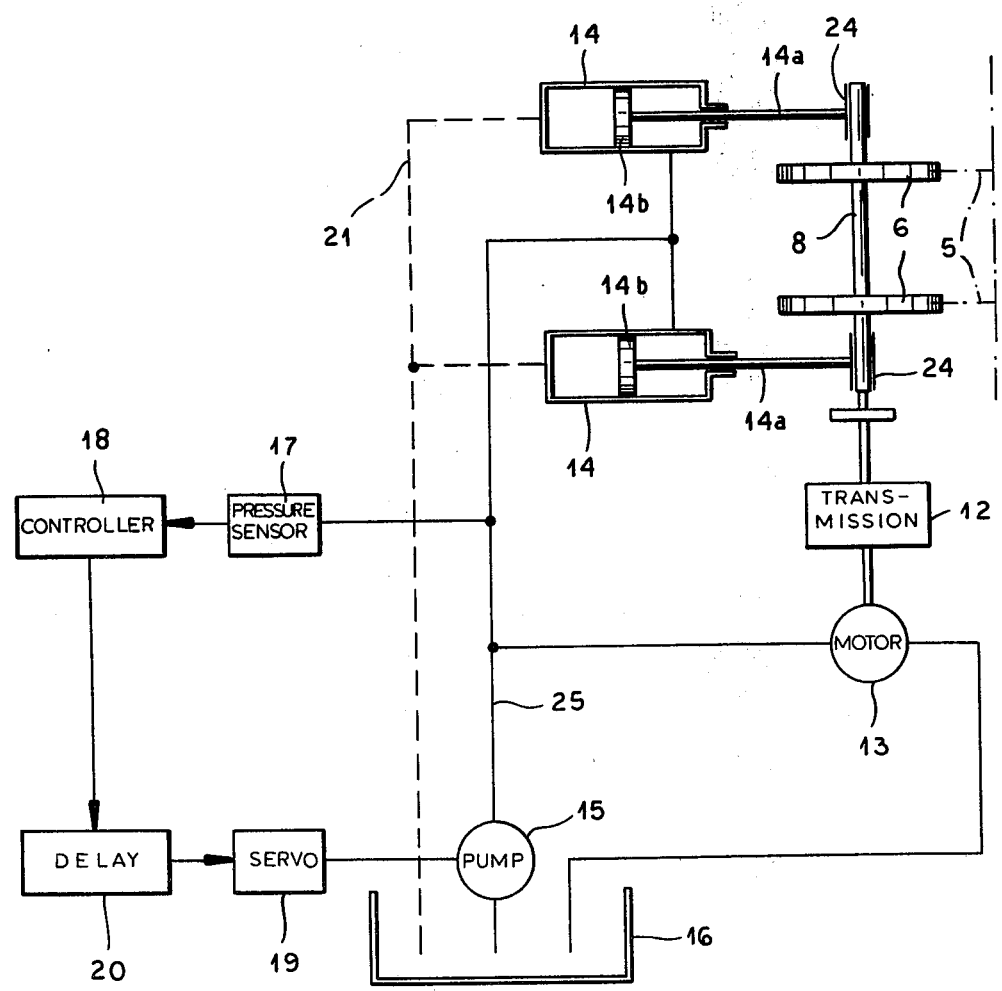
FIG. 2 is a schematic diagram illustrating the drive and control system of the instant invention.

As also seen in FIG. 2, the two faceted drive wheels or sprockets 6 are carried on a shaft 8 supported in the frame 23 at its ends in bearings 24. A positive-displacement pump operates as a motor 13 to drive the wheels 6 with a speed-reducing transmission 12 connected between them. The motor 13 rotates the wheels 6 so that the horizontal lower stretch 5c moving as shown by the arrows in FIG. 3 scrapes the bottom of the trough 2, then the picked-up ash is conveyed back and up by the stretches 5a and 5b to be dumped off the upper end at the wheels 6.

The bearings 24 of the ends of the shaft 8 of the drive wheels 6 are carried on respective piston rods 14a of pistons 14b slidable in respective cylinders 14. These cylinders 14 can be pressurized through a high-pressure line 25 from a pump 15 drawing hydraulic liquid out of a reservoir or sump 16. Leakage in the cylinders 14 is returned to the sump 16 through a return line 21.

This high-pressure line 25 is also connected to the motor 13, so that the pressure in the motor 13 is the same as that in the working chambers of the cylinders 14. Thus if the conveyor 4 is heavily loaded the pump pressure will increase, as the pump rotation is resisted, and pressure will similarly build up in the cylinders 14. The resultant tensioning of the chains 5 is therefore wholly a function of the loading. As the load increases chain tension increases and vice versa.

In addition a pressure sensor 17 converts the pressure in the line 25 into an electric signal that it feeds to a controller 18 that passes it through a delay circuit 20 to a servo 19 that operates the pump 15 also in accordance with the pressure. Thus, for example, when pressure increases in the system, indicating that a large mass of ash has just been dumped in the trough 2 on the conveyor 4, the system will slow down, while the biasing force on the wheels 6 is increased. It will function like this until the load is reduced, whereupon it will speed up again. Using an axial-piston pump which is slowed down by moving its swash plate toward a perpendicular-to-axis position it is possible to thus achieve increased torque such as described in pages 395ff of *Servomechanism Practice* of W. R. Ahrendt (McGraw-Hill; 1960).

Such operation is extremely simple to produce with this type of hydraulic system. It allows the system effectively to unload ash at a uniform rate when it itself is charged at a nonuniform rate. In addition it inherently conserves itself by tailoring the tension in the chains to the load.

I claim:

1. In combination with an ash-quenching trough, an ash-removal conveyor comprising:
   a drive wheel above and spaced from the trough;

horizontally spaced reversing and guide wheels in the trough below the liquid level therein;

an endless conveyor chain spanned over the wheels and having a horizontal lower stretch extending between the reversing and guide wheels, an inclined lower stretch extending between the guide and drive wheels, and an at least partially inclined upper stretch extending between the reversing and drive wheel;

drive means connected to the drive wheel for moving the chain and thereby picking ash up in the trough and conducting the picked-up ash from the trough, the drive means including
- a hydraulic motor operatively connected to the drive wheel, and
- pump means including a positive-displacement pump connected to the drive motor for supplying hydraulic liquid to the motor for operating same; and means for urging the drive wheel away from the other wheels and thereby tensioning the belt, the urging means including
- at least one hydraulic cylinder connected to the drive wheel and pressurizable to tension the chain,
- means connecting the cylinder to the pump means for pressurization of the cylinder with substantially the same pressure in the hydraulic means,
- sensor means for detecting the pressure in the cylinder and motor; and
- control means connected to the pump means for varying the mass flow rate of same in accordance with the detected pressure and for decreasing pump mass flow rate as detected pressure increases above a predetermined limit.

2. The ash-removal conveyor defined in claim 1, further comprising:
a floor immediately beneath and extending along the upper stretch between the reversing and drive wheels and above the lower stretches, the drive means moving the chain in a direction to pick up ash with the horizontal lower stretch and convey it away along the floor with the upper stretch.

3. The ash-removal conveyor defined in claim 1 wherein the sensor means produces an electrical output corresponding to the detected pressure and the control means receives the electrical output and responds to same.

4. The ash-removal conveyor defined in claim 1 wherein the control means includes delay means for varying the pump mass flow rate only after a predetermined interval in response to a change in the detected pressure.

5. The ash-removal conveyor defined in claim 1 further comprising an upper guide wheel subdividing the upper chain stretch into a horizontal upper stretch between the reversing wheel and the upper guide wheel and an inclined upper stretch between the upper guide wheel and the drive wheel.

6. In combination with an ash-quenching trough, an ash-removal conveyor comprising:
a drive wheel above and spaced from the trough;
horizontally spaced reversing and guide wheels in the trough below the liquid level therein;

an endless conveyor chain spanned over the wheels and having a horizontal lower stretch extending between the reversing and guide wheels, an inclined lower stretch extending between the guide and drive wheels, and an at least partially inclined upper stretch extending between the reversing and drive wheel;

drive means connected to the drive wheel for moving the chain and thereby picking ash up in the trough and conducting the picked-up ash from the trough, the drive means including
- a hydraulic motor operatively connected to the drive wheel, and
- pump means for supplying hydraulic liquid to the motor for operating same; and means for urging the drive wheel away from the other wheels and thereby tensioning the belt, the urging means including
- at least one hydraulic cylinder connected to the drive wheel and pressurizable to tension the chain,
- means connecting the cylinder to the pump means for pressurization of the cylinder with substantially the same pressure in the hydraulic motor,
- sensor means for detecting the pressure in the cylinder and motor and for producing an electrical output corresponding to the detected pressure;
- control means connected to the pump means for varying the mass flow rate of same in accordance with the detected pressure and for receiving the electrical output and responding the same; and
- signal delay means for retarding the transmission of the signal to the pump for varying the pump mass flow rate only after a predetermined interval in response to a change in the detected pressure.

7. The ash-removal conveyor defined in claim 6, further comprising:
a floor immediately beneath and extending along the upper stretch between the reversing and drive wheels and above the lower stretches, the drive means moving the chain in a direction to pick up ash with the horizontal lower stretch and convey it away along the floor with the upper stretch.

8. The ash-removal conveyor defined in claim 6 wherein the sensor means produces an electrical output corresponding to the detected pressure and the control means receives the electrical output and responds to same.

9. The ash-removal conveyor defined in claim 6 wherein the control means includes delay means for varying the pump mass flow rate only after a predetermined interval in response to a change in the detected pressure.

10. The ash-removal conveyor defined in claim 6 further comprising an upper guide wheel subdividing the upper chain stretch into a horizontal upper stretch between the reversing wheel and the upper guide wheel and an inclined upper stretch between the upper guide wheel and the drive wheel.

* * * * *